(12) United States Patent
Yuen

(10) Patent No.: US 6,538,701 B1
(45) Date of Patent: Mar. 25, 2003

(54) SIMULATED PIP WINDOW IN EPG

(75) Inventor: Henry C. Yuen, Pasadena, CA (US)

(73) Assignee: Gemstar Development Corporation, Pasadena, CA (US)

( * ) Notice: Subject to any disclaimer, the term of this patent is extended or adjusted under 35 U.S.C. 154(b) by 0 days.

(21) Appl. No.: 09/251,366

(22) Filed: Feb. 17, 1999

Related U.S. Application Data

(60) Provisional application No. 60/074,912, filed on Feb. 17, 1998.

(51) Int. Cl.[7] ............................ H04N 5/445; H04N 9/74
(52) U.S. Cl. ......................... 348/564; 725/48; 725/49; 348/584
(58) Field of Search ...................... 725/48, 49; 348/565, 348/584, 600, 598, 581

(56) References Cited

U.S. PATENT DOCUMENTS

| 5,528,304 | A | * | 6/1996 | Cherrick et al. ............ 348/565 |
| 5,844,620 | A | * | 12/1998 | Coleman et al. ............ 348/461 |
| 5,936,677 | A | * | 8/1999 | Fries et al. ................. 348/512 |
| 6,122,011 | A | * | 9/2000 | Dias et al. ................... 348/569 |
| 6,317,164 | B1 | * | 11/2001 | Hrusecky et al. ........... 348/581 |
| 6,397,386 | B1 | * | 5/2002 | O'Connor et al. ............ 725/39 |

* cited by examiner

*Primary Examiner*—Victor R. Kostak
(74) *Attorney, Agent, or Firm*—Christie, Parker & Hale, LLP

(57) ABSTRACT

A first signal representing a reduced size video program is transmitted from a central location to a plurality of user terminals in a television signal. A second signal representative of an EPG is generated at one of the user terminals. The first and second signals are linearly combined and applied to a display monitor to display the reduced size video program and the EPG on the screen of the monitor simultaneously in a PIG format. In one embodiment a plurality of reduced size video programs are transmitted in the television signal and one of them is selected for display in a PIG format by marking the program listing in the EPG corresponding to the selected reduced size video program with a cursor.

18 Claims, 3 Drawing Sheets

SIMULATED PIP WINDOW IN EPG

CROSS-REFERENCE TO RELATED APPLICATION

This application claims priority of U.S. application Ser. No. 60/074,912, filed on Feb. 17, 1998, the disclosure of which is incorporated fully herein by reference.

BACKGROUND OF THE INVENTION

This invention relates to television transmission and more particularly to a television system that displays a reduced size television program and an electronic program guide (EPG) without a PIP chip.

It is now common for EPG's to display a reduced size video program simultaneously on the screen with the television program listings, sometimes called picture-in-guide (PIG). In order to utilize a PIG format according to current practice, electronics to reduce the size of the video program, such as a PIP chip, is installed in the television receiver. However, a PIP chip is relatively expensive so many television receivers are without it. This denies to many television viewers the convenience of a PIG format.

SUMMARY OF THE INVENTION

To display an EPG, a first signal representing a reduced size video program is transmitted from a central location to a plurality of user terminals in a television signal. A second signal representative of an EPG is generated at one of the user terminals. The first and second signals are linearly combined and applied to a display monitor to display the reduced size video program and the EPG on the screen of the monitor simultaneously. As a result, a PIG format can be displayed without a PIP chip at the user terminals.

A feature of the invention is to transmit a plurality of reduced size video programs in the television signal and to select one of them for display in a PIG format by marking the program listing in the EPG corresponding to the selected reduced size video program with a cursor.

DESCRIPTION OF THE DRAWINGS

The features of specific embodiments of the best mode contemplated of carrying out the invention are illustrated in the drawings, in which.

DETAILED DESCRIPTION OF SPECIFIC EMBODIMENTS

The invention permits display of a video window in an electronic program guide (EPG) at a user terminal without a PIP chip.

Specifically, one or more reduced size video programs are generated at the head end of a television transmission network and distributed by the network to user terminals. The term "video program" is used herein to mean motion pictures, as distinguished from still frame pictures. At the user terminals the reduced size video program is overlaid on an EPG that is composed with a open area for the video program. Thus, the two video sources can be simply and linearly combined without a PIP chip, high speed video switching or any image overlap.

Figure 1:
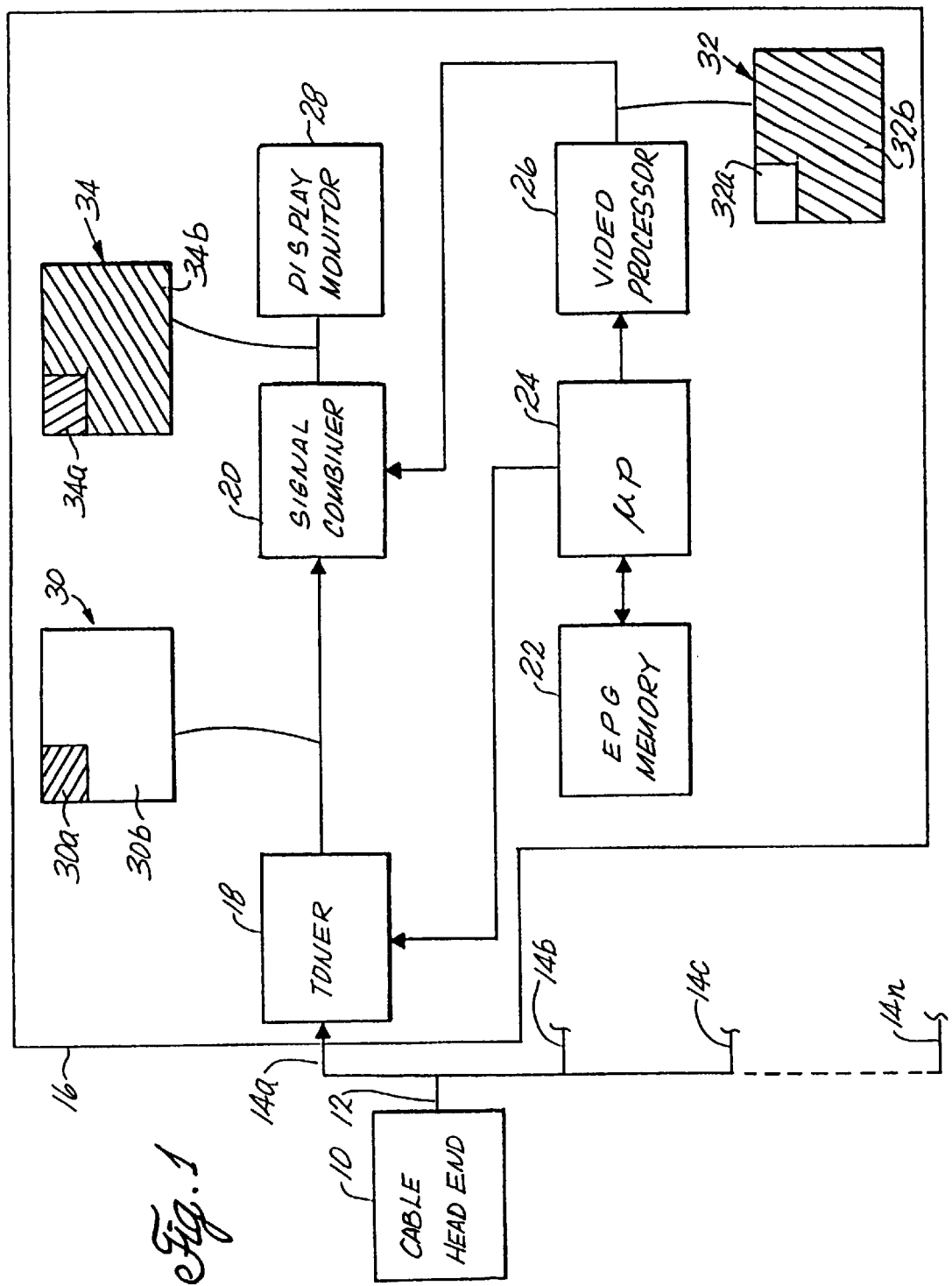
FIG. 1 is a schematic block diagram of one embodiment of the invention with screen displays that illustrate the principles of the invention.

FIG. 1 shows an analog television delivery system. A cable head end 10 is connected by a cable network 12 to drops 14a, 14b, 14c, . . . 14n, each of which feeds a user terminal such as terminal 16. At terminal 16 drop 14a feeds a channel tuner 18. The output of tuner 18 is coupled to one video input of a linear signal combiner 20. A data base of EPG data is stored in an EPG memory 22. The EPG data stored in memory 22 could be downloaded from time to time from head end 10 in the VBI of the television signal on one channel. EPG data is coupled to and from a microprocessor 24. The EPG data to be displayed is retrieved by microprocessor 24 and composed into on-screen program listings in a video processor 26, which is coupled to the other video input of signal combiner 20. The output of signal combiner 20 is connected to a display monitor 28. The Microprocessor 24 controls the channel setting of tuner 18.

One of the cable network channels is reserved for transmission of a reduced size video program. This reduced size video program is generated at head end 10 in the same way that a reduced size video program is created by a PIP chip at a user terminal, i.e., the analog television signal is digitized in an ADC and every third pixel in every third scan line is stored in a RAM. For the purpose of discussion, it is assumed that the remainder of the raster of the television signal on the reserved channel is unused. In operation, tuner 18 is set by microprocessor 24 to the channel reserved for the reduced size video program. Microprocessor 24 functions in conventional fashion to change channels and compose EPG data from memory 22 into on-screen program listings in video processor 26 responsive to a user operated remote controller (not shown). Video processor arranges the on-screen program listings so there is an unoccupied area for overlay of the reduced size video program. Reference is made to PCT Application WO96/07270, published on Mar. 7, 1996 and PCT Application WO99/04561, published on Jan. 28, 1999 for a further disclosure of the types of on-screen formats that can be used with the invention. The disclosure of this application is incorporated fully herein by reference. The television signal carrying the reduced size video program is coupled to signal combiner 20. As represented by an idealized display 30, the reduced size video program will occupy an area 30a on the screen of display monitor 28 and the remaining area 30b will be blank. The video signal carrying the on-screen display is converted to analog form and coupled by video processor 26 to signal combiner 20. As represented by an idealized display 32, an area 32a corresponding in size and position to the reduced size video program will be blank and the on-screen program listings will occupy an area 32b on the screen of display monitor 28 corresponding in size and position to the blank area 30b of display 30. The combined television signal is coupled by signal combiner 20 to display monitor 28. As represented by an idealized display 34, the reduced size video program will occupy an area 34a on the screen of display monitor 28 corresponding in size and position to area 30a of display 30 and the on-screen program listings will occupy an area 34b on the screen of display monitor 28 corresponding in size and position to area 32b of display 32. The portions of the television signal captured by tuner 18 outside of area 30a and the portions of the video signal from video processor 26 outside of area 32b are blank so these signals can be linearly combined without signal switching as is required in normal PIP display.

If more than one reduced size video program is transmitted on the reserved channel, e.g., nine video programs in different areas of the television raster, all but one of the video programs is masked off in signal combiner 20. The remaining selected video program stays in its original position so video processor 26 must compose the on-screen program listings to occupy different areas of the screen of display monitor 28, depending on the reduced size video program selected for display.

Figure 2:
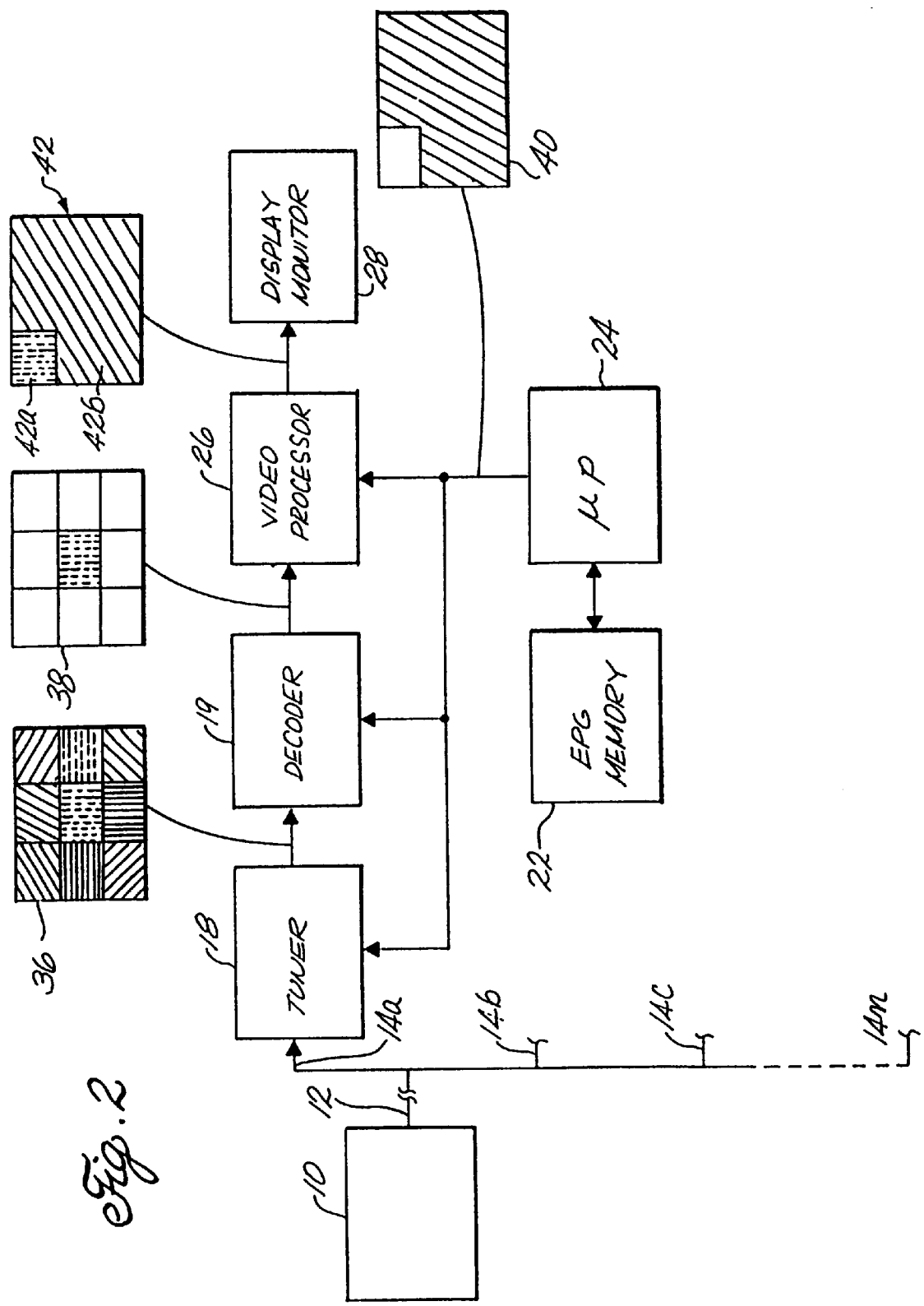
FIG. 2; is a schematic block diagram of another embodiment of the invention with screen displays that illustrate the principles of the invention.

FIG. 2 shows a digital television transmission system. Similar components have the same reference numerals as FIG. 1. A cable head end 10 is connected by a cable network 12 to drops 14a, 14b, 14c, ... 14n, each of which feeds a user terminal such as terminal 16. At terminal 16 drop 14a feeds a channel tuner 18. The output of tuner 18 is coupled to a decoder 19, the function of which is described below. A data base of EPG data is stored in an EPG memory 22. The EPG data stored in memory 22 could be downloaded from time to time from head end 10 in the digital data stream of the television signal on one channel. EPG data is coupled to and from a microprocessor 24. The EPG data to be displayed is retrieved by microprocessor 24 and composed into on-screen program listings in a video processor 26. A reduced size video program is also stored in video processor for display on monitor 28 with the program listings. The output of video processor 26 is connected to a display monitor 28.

In the embodiment of FIG. 2, one or more of the cable network channels are reserved for transmission of a plurality of reduced size video programs, e.g., nine programs assuming the size is reduced to one-third of the full screen image. The reduced size video programs are transmitted in digital form, as the full size programs on the other channels. As represented by an idealized display 36, the reduced size video programs are arranged in a three-by-three array timewise. The on-screen program guide has a cursor to select one of the displayed program listings responsive to microprocessor 24. Decoder 19 and tuner 18, if the desired reduced size video program is carried on a different channel than the channel to which tuner 18 is set, are controlled by microprocessor 24 to retrieve a reduced size video signal corresponding to the selected program listing. Preferably, the identification of the desired reduced size video program for each program listing, in terms of its channel and screen position, is stored in EPG memory 22 with the other data about the program listing. As represented by an idealized display 38, one of the reduced size video programs in digital form is selected by decoder 19 and is directly stored in video processor 26 without any further conversion. Decoder 19 comprises software or hardware implemented gates and timing circuits that selectively transmit only those parts of the digital data stream carried on the channel to which tuner 18 is set that make up the selected reduced size video program. Preferably, the reduced size video program is always stored in the same area of video processor 26, e.g., the upper left hand corner, so the format of the displayed EPG remains constant. As represented by an idealized display 40, the on-screen program listings supplied by microprocessor 24 are stored in the area of video processor 26 remaining after storage of the reduced size video program. The display data in video processor 26 is a bit map of the images displayed on monitor 28. Assuming the digital data representing the reduced size video signal and the on-screen program listing are in compatible format, the DAC used to develop on-screen program listing driving signals for monitor 28 can also display the reduced size video program without additional hardware. Any format changes are preferably made before the digital data is stored in video processor 26. In this embodiment, video processor 26 performs the linear signal combining function performed by signal combiner 20 in FIG. 1. As represented by an idealized display 42, the selected reduced size video program will be displayed in an area 42a and the on-screen program listings will be displayed in an area 42b.

Figure 3:
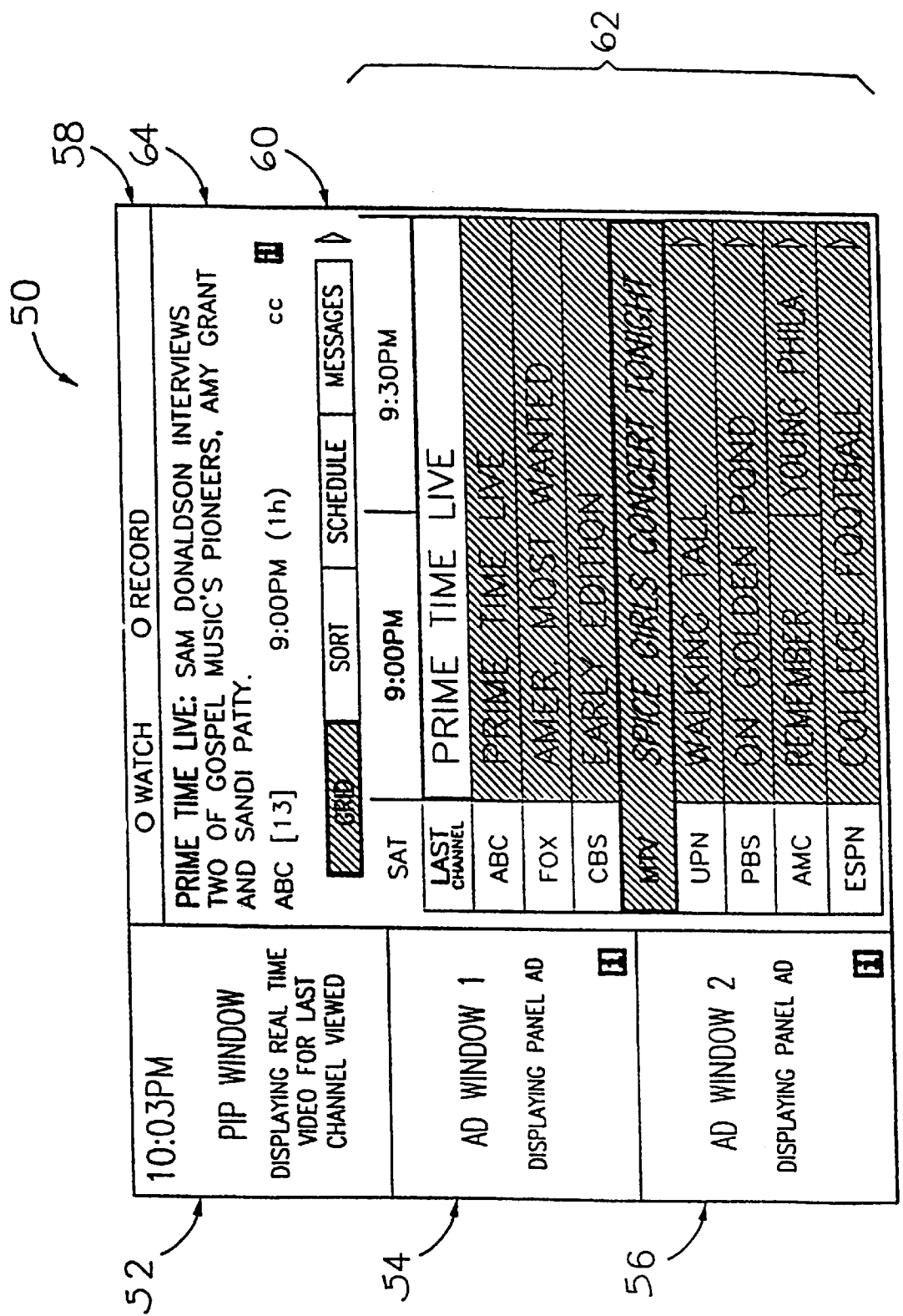
FIG. 3. is a diagram of a typical on-screen display generated by the invention.

In FIG. 3, one embodiment of the EPG with Ad Window and Advertising Messages is shown. A television screen display 50 could be generated by a conventional television receiver with interlaced scan lines, by a PC monitor with progressive scan lines, or by another other type of video display device. In the upper left hand corner of the screen is a PIP window 52, in which the reduced size video program is displayed. Below window 52 are Panel Ad Windows 54, and 56 ("Ad Windows"). Windows 52, 54, and 56 each typically occupy about 1/9 of the total screen area. The remainder of the screen area is typically occupied (moving from top to bottom of the screen) by an action key bar 58, a navigation bar 60, a grid guide 62 ("Grid Guide") in which the on-screen television program listings appear, and an information box 64 (the "detailed information area).

The invention is particularly useful in a pay per view television program delivery system as described in U.S. patent application Ser. No. 08/715,782, filed on Sep. 19, 1996, the disclosure of which is incorporated fully herein by reference. The video clips can be downloaded to the user in reduced size form to conserve channel space, i.e., nine video clips can be downloaded in a channel instead of one video clip. Preferably, the video clips are downloaded in carousel fashion, i.e., they are transmitted repeatedly, so they are always available when a program listing is selected in grid guide 62. At the user terminals, a decoder can select the video clip corresponding to the selected pay per view program listing. If the delivery system is analog, the analog scan lines corresponding to the selected reduced size video clip are coupled through an ADC to a RAM, which could be the bit mapping RAM of the video processor. If the delivery system is digital, the digital data corresponding to the selected reduced size video clip is coupled through directly to a RAM, which could be the bit mapping RAM of the video processor.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the EPG data base could be acquired and updated in other way than transmission with the television signal; it could be transmitted over a pager link or the Internet. Further in a digital television transmission system each reduced size video program could be transmitted in the same digital data stream as the full size version of the video program; when a particular channel is then selected by a viewer, the reduced size image is available to be displayed in an EPG viewing mode and the full size image is available to be displayed in a television viewing mode. Although the invention is described in the context of a cable television distribution signal, it is applicable to broadcast and satellite distribution as well.

What is claimed is:

1. A method of displaying an EPG comprising the steps of:

transmitting a first signal of a reduced size video program from a central location to a plurality of user terminals in a television signal, each user terminal having a display monitor with a screen;

generating a second signal of an electronic program guide (EPG) at one of the user terminals;

linearly combining the first and second signals; and applying the first and second signals to the display monitor to display the reduced size video program and the EPG on the screen simultaneously.

2. The method of claim 1 further comprising:

transmitting a plurality of first signals of reduced size video programs as one video signal to the user terminals;

selecting one of the plurality of first signals; and linearly combing the selected first signal with the second signal to display the reduced size video program of the selected first signal and the EPG on the screen simultaneously.

3. The method of claim 2 wherein the EPG comprises a plurality of program listings corresponding to the video programs and further comprising displaying a movable cursor on the screen to mark one of the plurality of program listings, and selecting one of the plurality of first signals corresponding to the marked program listing for combining with the second signal to display simultaneously the video program corresponding to the marked program listing and the EPG.

4. The method of claim 2 further comprising masking out unselected first signals of the plurality of first signals transmitted.

5. The method of claim 4 further comprising blanking out a portion of the second signal based on the unselected first signals masked out.

6. The method of claim 2 further comprising blanking out a portion of the one video signal occupied by unselected first signals of the plurality of first signals.

7. The method of claim 6 further comprising blanking out a portion of the second signal based on a portion of the screen to be occupied by the reduced size video program of the selected one of the plurality of first signals.

8. The method of claim 2 wherein each reduced size video program of each first signal of the plurality of first signals is assigned a portion of a screen, such that the aggregation of the reduced size video programs fills an entire screen.

9. The method of claim 2 further comprising tuning to a channel reserved for the plurality of first signals.

10. The method of claim 2 further comprising tuning to a channel based on the selected one of the plurality of first signals.

11. The method of claim 2 wherein the EPG is arranged to provide an area to be occupied by a reduced size video program prior to generating the second signal.

12. The method of claim 2 wherein the first signal includes the reduced size video program having a specific size and position and a first blanked out area outside the specific size and position of the reduced size video program, such that the reduced size video program and the first blanked out area together cover an entire screen.

13. The method of claim 12 wherein the second signal includes the EPG having a specific size and position and a second blanked out area outside the specific size and position of the EPG, such that the EPG and the second blanked out area together cover an entire screen.

14. The method of claim 13 wherein the first blanked out area corresponds in size and position to the second blanked out area.

15. A system of displaying an EPG, the system comprising:

a tuner configured to receive a plurality of transmitted reduced size video programs on one video signal;

memory having an electronic program guide (EPG);

a video processor configured to select one of the plurality of transmitted reduced size video programs and to linearly combine the EPG to the selected one of the plurality of transmitted reduced size video programs.

16. The system of claim 15 further comprising a processor coupled to the tuner to cause the tuner to tune to a channel based on the selected one of the plurality of transmitted reduced size video programs.

17. The system of claim 15 further comprising a decoder coupled to the tuner to mask out an unselected plurality of transmitted reduced size video programs.

18. The system of claim 15 wherein the video processor linearly combines the EPG to the selected one of the plurality of transmitted reduced size video programs by combining the selected one of the plurality of transmitted reduced size video programs and a first blanked portion with the EPG and a second blanked portion, the first blanked portion having a corresponding size and position as the second blanked portion.

* * * * *